Oct. 16, 1923.  1,471,237
O. H. BROWN
TIRE GUARD
Filed Aug. 30, 1922  2 Sheets-Sheet 1
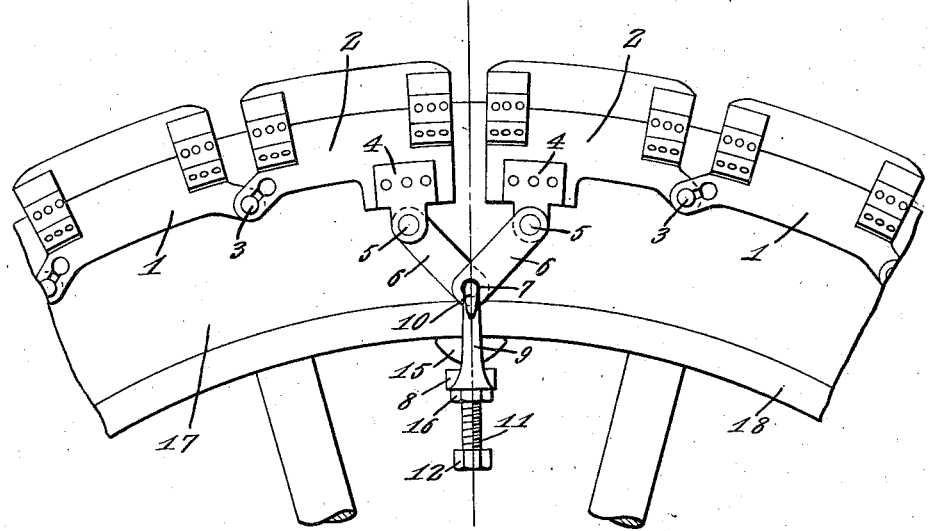
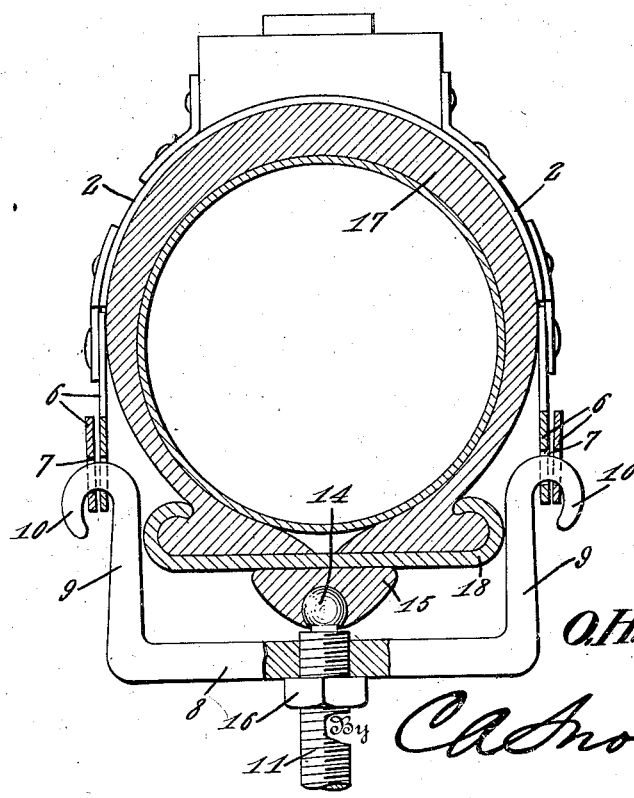
Inventor
O. H. Brown, Oct. 16, 1923.
O. H. BROWN
1,471,237
TIRE GUARD
Filed Aug. 30, 1922     2 Sheets-Sheet 2
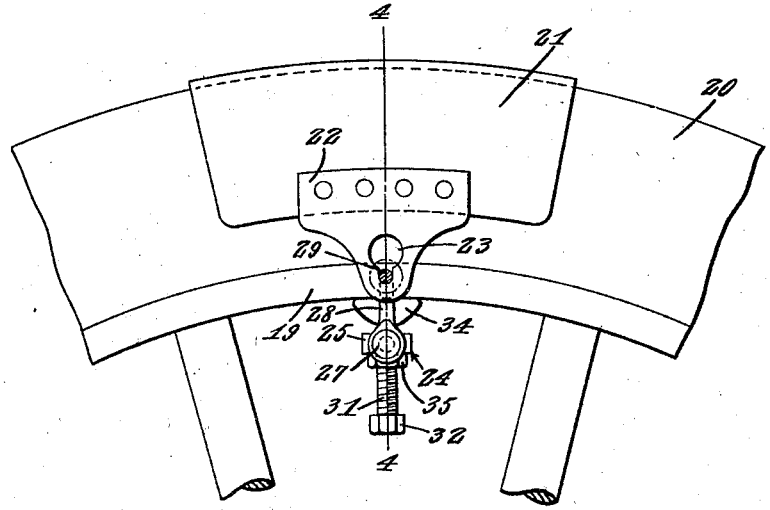
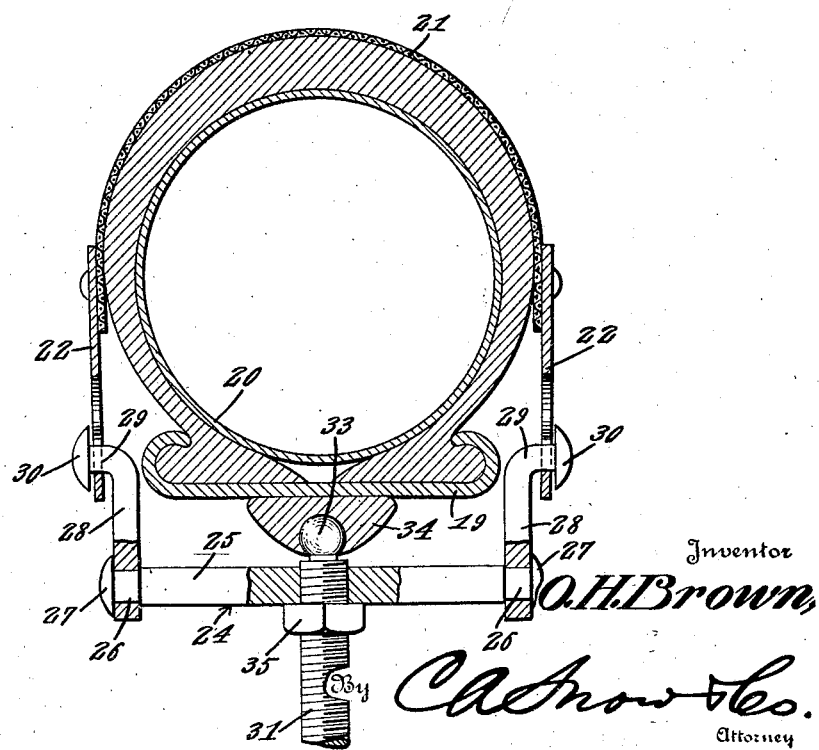
Inventor
O.H.Brown,
By C.A.Snow & Co.
Attorney Patented Oct. 16, 1923.

1,471,237

UNITED STATES PATENT OFFICE.

OBEDIAH H. BROWN, OF OXFORD, NEW JERSEY.

TIRE GUARD.

Application filed August 30, 1922. Serial No. 585,213.

*To all whom it may concern:*

Be it known that I, OBEDIAH H. BROWN, a citizen of the United States, residing at Oxford, in the county of Warren and State of New Jersey, have invented a new and useful Tire Guard, of which the following is a specification.

This invention aims to provide novel means for holding a tread on a vehicle tire, regardless of whether the tread be in the form of a protector, an anti-skidding device, a blow-out patch or the like, the construction being such that the tread may be held in place readily and be detached with equal facility.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a section on the line 2—2 of Figure 1, parts being broken away and parts remaining in elevation; Figure 3 is an elevation showing a modified form of the invention; Figure 4 is a section on the line 4—4 of Figure 3.

In Figures 1 and 2 of the drawings there is shown a tread comprising any desired number of intermediate members 1 and terminal members 2, the members 1 and 2 being detachably interengaged for relative pivotal movement, as designated by the numeral 3. The tread is not described in detail, because I wish to use a tread of any desired sort, and because, further, I am aware of the fact that no specific form of tread can be claimed in the same application with an attaching means.

Brackets 4 are attached to the side portions of the terminal tread members, the brackets carrying pivot elements 5 whereon are mounted the outer ends of inwardly converging links 6, the inner ends of the links 6 being overlapped on each other and being provided with registering openings 7.

The numeral 8 denotes a yoke having outwardly projecting arms 9 terminating in laterally extended attaching elements 10 such as hooks, the hooks 10 being detachably received in the openings 7 of the links 6. A pressure member 11, such as a screw, is threaded into the intermediate portion of the yoke 8 and is supplied at one end with a turning head 12. The other end of the screw 11 carries a ball 14 whereon a foot 15 is swiveled. A lock nut 16 is threaded on the screw 11.

The numeral 17 marks a tire, and the numeral 18 denotes a rim, carrying the tire. The tread extends circumferentially of the tire 17 and the yoke 8 extends transversely of the rim 18. The screw 11 is advanced in the intermediate portion of the yoke 8 through the instrumentality of the turning head 12, the foot 15 being pressed against the rim 18, the yoke 8 moving toward the center of the wheel which carries the tire. The links 6 are drawn toward parallelism with each other and in this way, the tread is tightened circumferentially of the tire, and, at the same time, the tread is drawn inwardly toward the center of the wheel which carries the tire. The screw 11 may be held in any position to which it may have been adjusted, by advancing the lock nut 16 until the same bears against the intermediate portion of the yoke 8, as shown in Figure 2 of the drawings.

Passing to Figures 3 and 4, the numeral 19 marks a rim, and the numeral 20 designates a tire on the rim. The tread member is in the form of a blow-out patch 21, brackets 22 being secured to the side portions of the patch. In the brackets 22, key-hole slots 23 are formed.

The numeral 24 designates, generally, a yoke including a cross bar 25 having reduced ends 26 provided with heads 27. The yoke includes, further, outwardly extended arms 28 mounted to swing on the ends 27 of the cross bar 26, the arms having laterally extended attaching elements 29 in the form of fingers, the fingers or attaching elements 29 carrying enlarged heads 30. A tightening device, such as a screw 31 is threaded into the cross bar 25 and is supplied at one end with a turning head 32, the other end of the screw carrying a ball 33 whereon a foot 34 is swiveled. A nut 35 is threaded on the screw 31.

In practical operation, the blow-out patch 21 is placed on the tire 20, the heads 30 of the arms 28 are passed through the enlarged portions of the key-hole slots 23 in the brackets 22, and, then, the arms 28 are moved inwardly, toward the center of the rotation of the wheel which carries the tire, the elements 29 being lodged in the reduced portions of the key-hole slots 23. When the screw 31 is advanced, the foot 34 bears against the rim 19 and the blow-out patch is held securely on the tire. The screw 31 may be held in any position to which it may have been adjusted, by advancing the nut 35 until the same bears against the cross bar 25 of the yoke 24.

What is claimed is:—

1. In a device of the class described, a tread comprising relatively movable members; converging links pivoted to the tread members at each side thereof; a yoke engaged with the links at each side of the tread members; and a pressure member carried by the intermediate portion of the yoke.

2. In a device of the class described, relatively movable tread members; links pivoted to the tread members and having their ends overlapped, the overlapped ends of the links being provided with registering openings; a yoke detachably engaged in the openings of the links; and a pressure member carried by the intermediate portion of the yoke.

3. In a device of the class described, relatively movable tread members; converging links pivoted at their outer ends to the tread members, the inner ends of the links being overlapped and being provided with registering openings; a yoke comprising arms having attaching elements received detachably in the openings of the links; a screw threaded into the intermediate portion of the yoke; a nut on the screw and cooperating with the yoke to hold the screw against movement; and a foot pivotally mounted on the screw.

In testimony that I claim the foregoing as my own, I have hereto affixed my signature in the presence of two witnesses.

OBEDIAH H. BROWN.

Witnesses:
JOHN ELLSWORTH,
ORA ELLSWORTH.